March 26, 1940.　　J. M. CONNELL ET AL　　2,194,820
COOKING AND HEATING UTENSIL
Filed Feb. 6, 1939　　2 Sheets-Sheet 1

John M. Connell
Raymond M. Sorum
Paul W. Murphy
INVENTORS.

BY Crosby Gauthier
ATTORNEY.

March 26, 1940.　　　J. M. CONNELL ET AL　　　2,194,820
COOKING AND HEATING UTENSIL
Filed Feb. 6, 1939　　　2 Sheets-Sheet 2
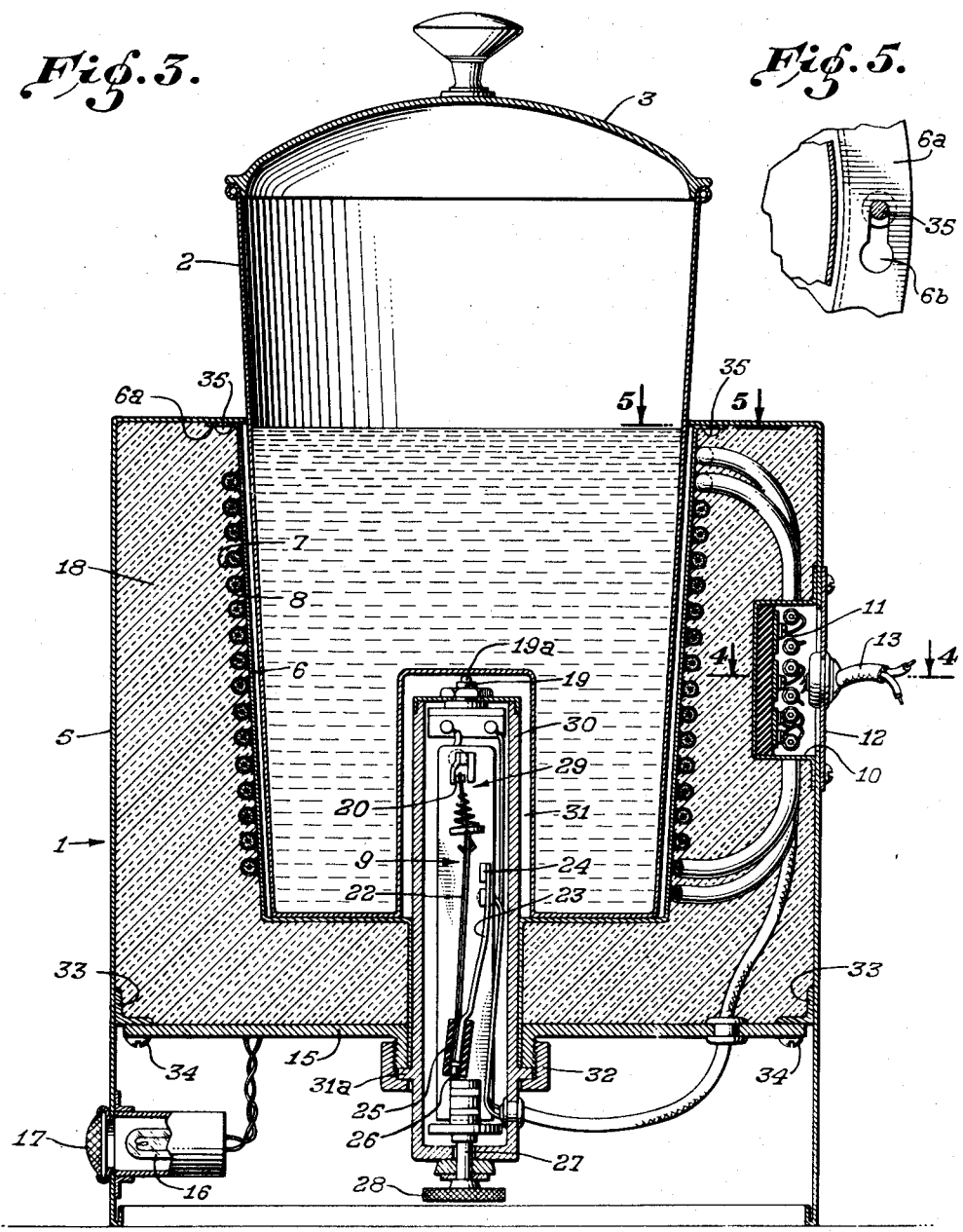
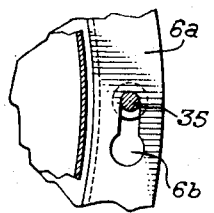
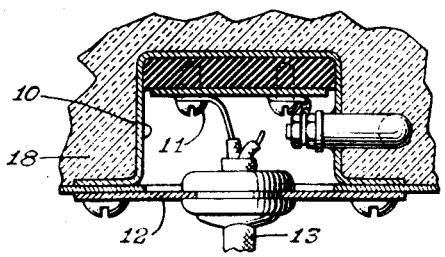
John M. Connell
Raymond M. Sorum
Paul W. Murphy
INVENTORS.
BY Crosby Gauthier
ATTORNEY.

Patented Mar. 26, 1940

2,194,820

UNITED STATES PATENT OFFICE 2,194,820

COOKING AND HEATING UTENSIL

John M. Connell, Raymond M. Sorum, and Paul W. Murphy, Palm Springs, Calif.

Application February 6, 1939, Serial No. 254,858

7 Claims. (Cl. 219—43)

This invention relates to heating and cooking utensils and its primary object is to provide a utensil which is particularly well adapted for use at lunch counters, soda fountains and the like in the preparation of hot drinks such as chocolate and cocoa, and hot foods such as soup—particularly canned soup. The device is intended more especially for use in the filling of individual customer demands for hot drinks and certain hot foods which cannot feasibly be prepared in advance and kept hot awaiting prospective orders.

In the operation of soda fountains and quick lunch counters the time required to fill the average customer's order—especially during rush hours—is a matter of considerable importance; not only because the customer is usually in a hurry to be served, but because the volume of business transacted frequently is a direct function of the speed with which customers are served and are thus prepared to leave and make room for other customers.

Hot chocolate and other low-priced hot drinks are reasonably profitable items at soda fountains; but with such facilities as have heretofore been available for the preparation of such drinks most soda fountain and quick lunch operators regard them as nuisances—especially during rush hours —partly for the reason stated above and partly because such drinks require careful watching by the attendant to prevent boiling.

The electric cooking and heating utensil hereinafter described, and which is illustrated as the preferred embodiment of our invention, overcomes the aforementioned obstacles to the profitable sale of individually prepared hot drinks and is characterized by the provision of a pre-heating element which maintains the utensil continuously (when plugged in) warm or moderately hot—though drawing only a few watts—and a second heating element of considerably higher wattage which is automatically cut in whenever the fluid receptacle is placed in the utensil—the temperature of the fluid drink being thus very quickly brought up to the desired value.

Another feature of our invention resides in the provision of a thermostatically-operated cut-out switch—the thermostat being so situated that the heat which affects it is transmitted mainly through the fluid content of the hot drink receptacle. The thermostatic cut-out switch operates automatically to break the circuit of the main heating element as soon as the fluid content of the receptacle has reached a predetermined value—which value preferably is well below the boiling point of the fluid. When the automatic cut-out switch opens, the content of the receptacle is ready to serve; but if the receptacle is not then withdrawn from the utensil the drink will not get cold because as soon as its temperature drops a very few degrees the automatic cut-out switch again closes, completing the circuit of the main heating element. Thus the drink is quickly prepared without any danger of boiling and is maintained at the desired temperature until served; while the attendant is not obliged to divert his attention from other duties immediately at hand in order to forestall a boiling-over of the drink being prepared.

Still another feature of our invention consists in the provision of a lamp signal which functions automatically to inform the attendant that the drink is ready to serve.

In the drawings which accompany this specification:

Fig. 3 is a somewhat enlarged vertical section of the utensil and fluid receptacle;

Fig. 4 is a fragmentary cross-section taken along the line 4—4 of Fig. 3; and

Fig. 5 is an enlarged detail taken at 5—5 on Fig. 3.

Figure 1:
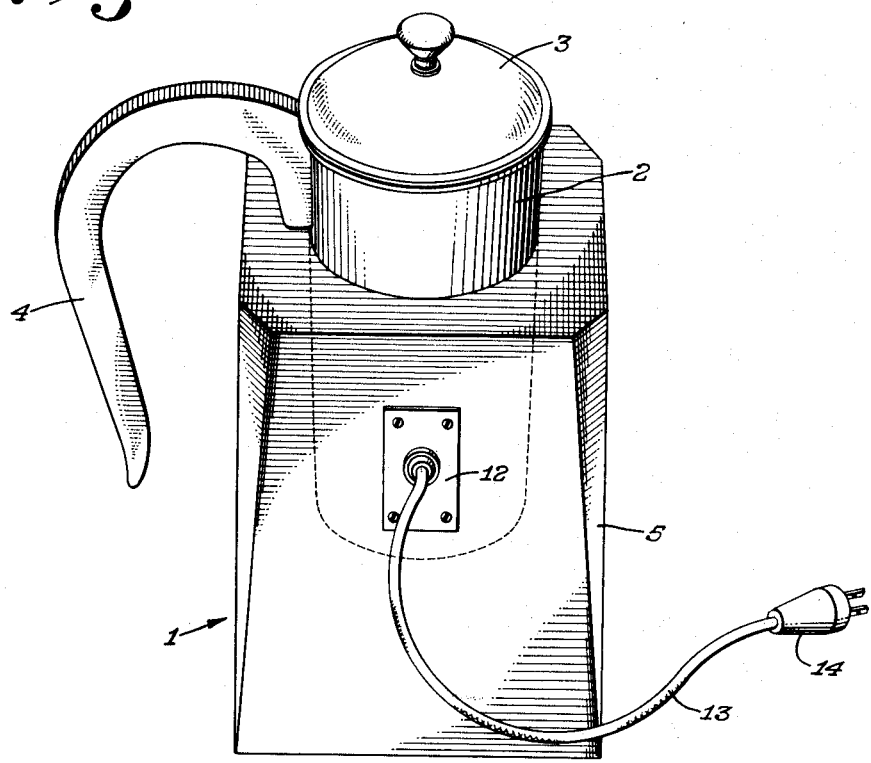
Fig. 1 is a perspective view of a utensil in accordance with our invention—a fluid receptacle being shown inserted therein.

The structure illustrated comprises two major parts, namely: the cooking or heating utensil, which is identified as a whole by reference numeral 1, and the fluid receptacle 2 having a removable cover 3 and a handle 4 by means of which it can conveniently be lifted and put in and taken out of the utensil.

The utensil 1 comprises an approximately rectangular sheet metal container 5, which may advantageously be made of stainless steel or brass; a sheet metal cup-like member 6 which also may be made of stainless steel or brass; two electrical heating elements 7 and 8, respectively; a thermostatically operated cut-out switch 9; a terminal box 10, enclosing terminals 11; a terminal box cover-plate 12; a flexible electric cord 13 provided with a conventional plug 14; a removable bottom plate 15; a signal lamp 16 disposed behind a jewel glass 17; thermal insulation packing material 18; and a snap switch 19.

Figure 2:
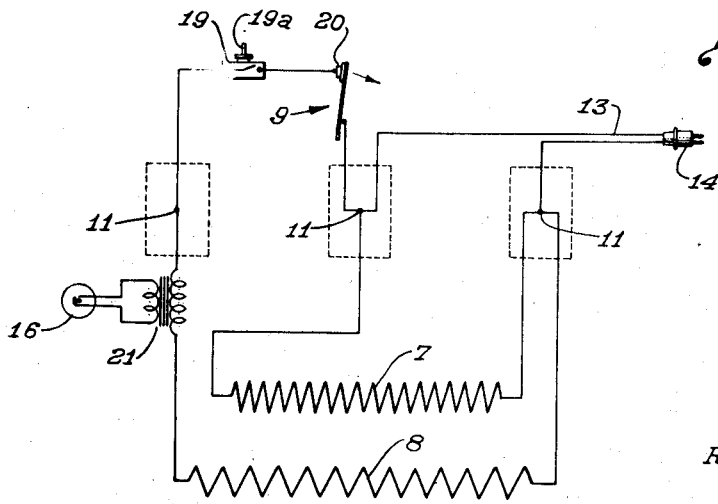
Fig. 2 is a circuit diagram.

It is thought that the device will be more readily apprehended if the circuit diagram of Fig. 2 is explained at this point, before proceeding with our description of the structure. In Fig. 2 there are shown two resistance heating elements 7 and 8, respectively—the terminals of the former being permanently connected to the two conductors of cord 13. One terminal of element 8 is permanently connected to one conductor of cord 13 while the other terminal is connected with the other cord conductor through contact 20 of the thermostatically operated cut-out switch 9, the normally open switch 19, and the primary winding of a step down transformer 21.

Resistance element 7 is of such ohmic value as to produce only a moderate amount of heat—the idea being to keep the utensil, when plugged in but not in actual use, at such a temperature that very little time will be lost in bringing it up to full heat when switch 19 is closed. Assuming the service voltage to be 110 to 120, the resistance of element 7 may generally be of the order of 200 ohms, while that of element 8 may generally be of the order of 25 to 50 ohms. But these values are, of course, mere generalities, as will be self-evident.

When the utensil is not in use, the fluid receptacle 2 is withdrawn therefrom and, as will presently be explained, switch 19 is open. Hence, element 8 is not energized and the signal lamp 16 is not lighted. Contact 20, however, is closed.

Switch 19 is shown in Fig. 3 and is of the push-button, snap type—its contacts being closed only when the push button 19a is held down. Since this switch is a familiar commercial item which is readily obtainable in the open market, it is unnecessary to illustrate or describe it in any further detail.

The thermostatic switch 9 is fully described in U. S. Letters Patent No. 1,983,077 granted to Benjamin E. Getchell, December 4, 1934, and requires no further description here beyond mentioning that the element 22 is a bi-metallic strip; element 23 is a flexible metal strip anchored at 24 and connected at 25 to the lower end of the bi-metallic strip; element 26 is an eccentric pin carried by a shaft 27; element 28 is a finger-operated knurled disc which is rotatable with shaft 27; and 29 is a snap switch assembly which includes contacts 20. The function of the thermostatic switch is to make and break contact 20—the break occurring when the temperature of the fluid content of receptacle 2 has risen to the predetermined value. As fully explained in the aforementioned Getchell patent, the temperature at which contacts 20 will break is controllable by rotating the knurled disc 28.

The thermostat is mounted in a metal tube 30 which extends upwardly into a recess 31 formed in the bottom of receptacle 2, and is provided with a collar 31a by which it is secured to bottom plate 15 through the medium of a retaining nut 32. Manifestly, the thermostat assembly, including switch 19, can easily be withdrawn when necessary.

Heating elements 7 and 8 are, preferably, of the type wherein the resistance wire is enclosed within an iron or ferrous alloy tube from which it is insulated and which can be spot welded to the outer surface of cup 6.

Bottom plate 15 is secured to an angle iron 33 by means of screws 34, and is readily removable.

Cup 6 has a flange 6a in which are punched a number of bayonet openings 6b (see Fig. 5), through the medium of which the cup is removably engageable with downwardly projecting headed pins 35, which are spot welded to the under side of the top surface of container 5. Obviously, the cup, together with the heating elements, can easily be withdrawn after removing the bottom plate.

The thermostat being situated as shown is affected almost entirely by heat which is transmitted to it through the fluid content of receptacle 2, and for that reason it will not operate to open the circuit of heating element 8 until the temperature of the fluid has risen to the desired value. By locating the thermostat centrally and projecting it up into the recess 31, it becomes practicable to wind the heating elements completely around the cup—this being the most efficient arrangement for transference of heat to the fluid.

In operation the device is continuously plugged into a service outlet and the low-wattage heating element 7 is thus kept energized and the utensil maintained at a moderate heat. The fluid receptacle is not kept in the utensil except when it is actually being used to make a hot drink. When the receptacle has been filled, preparatory to making a hot drink, it is lowered into the utensil and, by virtue of its weight, it depresses the push-button 19a, which closes the circuit of heating element 8 and at the same time causes signal lamp 16 to light. This tells the attendant that the current is on full, and he need give the order no further attention until the lamp is extinguished.

Heating element 8 being of comparatively high wattage, heat is generated very copiously; and since the utensil has been well heated up in advance, a relatively small amount of the heat initially generated by element 8 is absorbed by the utensil itself or otherwise uselessly dissipated. Therefore, very little time is lost in getting the heat from element 8 into the fluid. When the fluid has reached the desired temperature, the heat transferred therefrom to the thermostat is sufficient to operate the latter and effect an opening of contact 20; whereupon the current supply to element 8 and lamp 16 is interrupted—the latter being extinguished and thus serving to inform the attendant that the order is ready to serve. If the attendant does not withdraw the fluid receptacle from the utensil within a short time, the thermostat will again operate to close contact 20; and the drink is maintained near the maximum predetermined temperature until finally it is served. The thermostat illustrated has a small temperature range and, for that reason, if the signal lamp is re-lighted after the first extinction it will again be extinguished very quickly. That is because the time required to restore the fluid to maximum temperature is extremely short.

What is claimed is:

1. In combination, a cooking or heating utensil having a cup-like recess extending downwardly from the top of the utensil, an electric heating element surrounding said recess, a circuit for said heating element, a fluid receptacle designed to be lowered at least part way into said recess and to substantially fill said recess, said receptacle having a central recess extending upwardly from the bottom thereof and opening at the bottom thereof, a cut-out switch included in said circuit, a thermostat for operating said cut-out switch, said thermostat forming a part of said utensil and projecting upwardly into the aforementioned recess in the bottom of said fluid receptacle, and a second switch included in said circuit and arranged to be actuated in response to an insertion of said fluid receptacle into said first-mentioned recess, said second switch being normally open and operative to close its contacts upon being actuated.

2. In combination, a cup-like fluid receptacle having an external central recess extending upwardly from the bottom thereof, a cooking or heating utensil comprising a container and having a downwardly extending recess designed to receive the lower portion of said fluid receptacle and to be substantially filled thereby, said receptacle being removable at will from said utensil, a cup-like sheet metal member defining said last-mentioned recess, said member being disposed within said container, an electric heating element coiled around said last-mentioned member, a removable bottom plate secured to said container and forming a bottom closure therefor, a vertical tube secured to said bottom plate and extending upwardly therefrom into the recess in the bottom of said fluid receptacle, a thermostat enclosed within said tube, a cut-out switch arranged to be actuated by said thermostat, a circuit including said heating element and said cut-out switch, and a second switch mounted at the upper end of said tube, said second switch being normally open and included in said circuit and arranged to be engaged and operated by said fluid receptacle when the latter is inserted into said utensil, said second switch being operative to close said circuit in response to an insertion of said fluid receptacle as aforestated.

3. In combination, a cup-like fluid receptacle, a cooking or heating utensil having a cup-like recess extending downwardly from the top of the utensil and designed to receive the lower portion of said fluid receptacle, said receptacle being removable at will from said utensil, two electric heating elements coiled around and adjacent said recess, one of said elements being of low wattage and the other of relatively high wattage, a pair of electric terminals adapted to be connected to a current supply source, said low-wattage element being continuously connected across said terminals, a circuit for said high-wattage element including an automatic cut-out switch and a second switch, both in series with said high-wattage element, and a thermostat operative to open said automatic cut-out switch in response to a predetermined temperature, said thermostat being so situated as to be affected mainly by the temperature of the fluid in said receptacle, said second switch being normally open and arranged to be closed and held closed by the weight of said fluid receptacle when the latter is inserted in said utensil.

4. In combination, a cup-like fluid receptacle having an axial re-entrant portion extending upwardly from the bottom and defining an upwardly extending recess opening only at the bottom, and a cooking or heating utensil designed to function conjointly with said fluid receptacle, said utensil comprising: a container, a cup-like member opening at the top and removably secured to said container, said member defining a recess for the reception of said fluid receptacle, a low-wattage heating element and a high-wattage heating element in said container, a bottom member for said container, and a vertical tube supported by said bottom member and projecting into said upwardly extending recess in said fluid receptacle, when said receptacle is in said utensil, a normally open switch mounted at the top of said tube and operable to close its contacts by the weight of said fluid receptacle, said switch being operative to re-open automatically when said receptacle is withdrawn from the utensil, a normally closed automatic cut-out switch and a thermostat for operating said cut-out switch, both enclosed within said tube, a pair of terminals for connection to an electric current supply source, said low-wattage heating element being continuously connected across said terminals, and a circuit including said terminals and said high-wattage heating element in series with the contacts of both aforementioned switches.

5. A cooking or heating utensil comprising: a container having a downwardly extending recess, an electric heating element coiled around and adjacent said recess, a thermostat projecting upwardly from the bottom of said recess, a cut-out switch operable by said thermostat, a circuit including said element and said switch in series, and a signal lamp mounted on said container so as to be visible to an attendant, the operation of said signal lamp being under the control of said circuit.

6. A cooking or heating utensil comprising: a sheet metal container, a cup-like member removably secured to said container and defining a downwardly extending recess in said container for the reception of a fluid receptacle, a low-wattage electric heating element and a high-wattage electric heating element, each coiled around said member and attached thereto, a removable bottom plate for said container, said bottom plate having a central opening, a vertical tube located in said opening and removably secured to said bottom plate, said tube projecting upwardly into said recess, a thermostat in said tube, a cut-out switch operable by said thermostat, a normally open push-button switch mounted on top of said tube and adapted to be operated by the insertion of a fluid receptacle in said recess, a pair of current supply terminals, said low-wattage heating element being continuously connected across said terminals, and a circuit interconnecting said terminals with said high-wattage heating element, said circuit including both of said switches in series.

7. In combination, a cooking or heating utensil having a cup-like recess extending downwardly from the top of the utensil, an electric heating element surrounding said recess, a circuit for said heating element, a fluid receptacle designed to be lowered at least part way into said recess and to substantially fill said recess, said receptacle having a central recess extending upwardly from the bottom thereof and opening at the bottom thereof, a cut-out switch included in said circuit, and a thermostat for operating said cut-out switch, said thermostat forming a part of said utensil and projecting upwardly into the aforementioned recess in the bottom of said fluid receptacle.

JOHN M. CONNELL.
RAYMOND M. SORUM.
PAUL W. MURPHY.